(No Model.)
L. D. ALLEN.
CAR AXLE.
No. 363,789. Patented May 31, 1887.
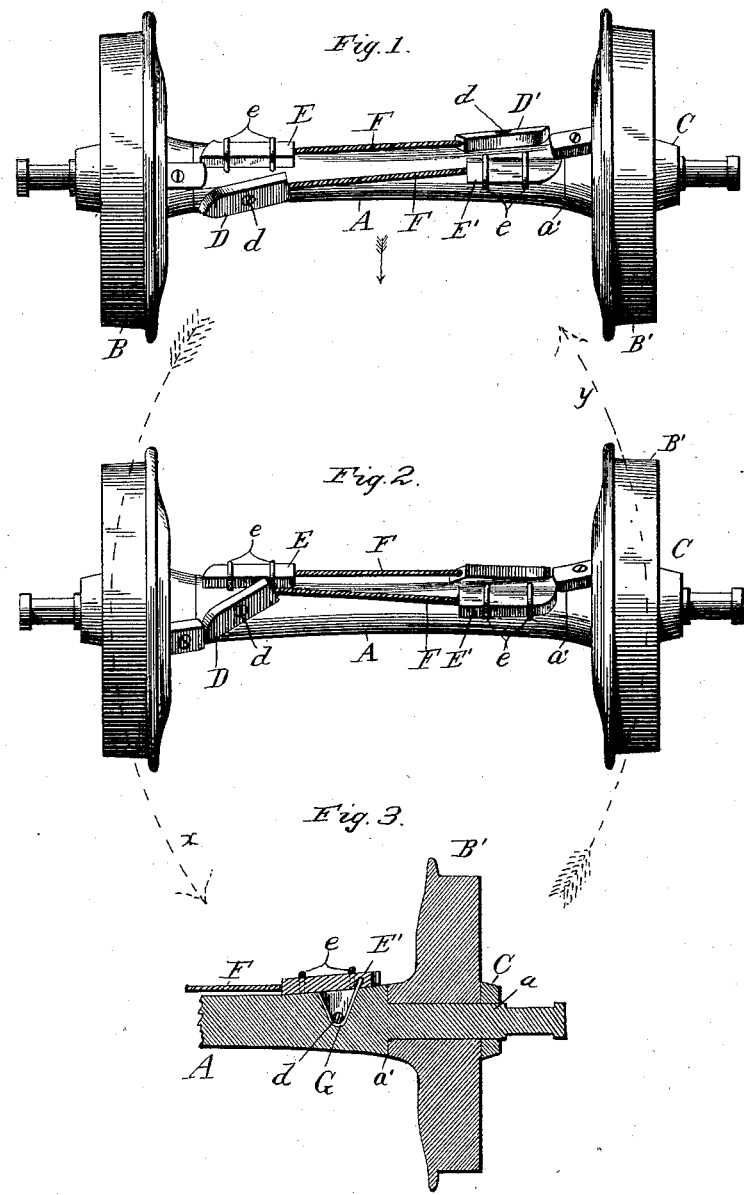

UNITED STATES PATENT OFFICE.

LEVI D. ALLEN, OF GRAYLING, MICHIGAN, ASSIGNOR OF ONE-HALF TO HARRY WOODS, OF SAME PLACE.

CAR-AXLE.

SPECIFICATION forming part of Letters Patent No. 363,789, dated May 31, 1887.

Application filed March 19, 1887. Serial No. 231,523. (No model.)

*To all whom it may concern:*

Be it known that I, LEVI D. ALLEN, a citizen of the United States, residing at Grayling, in the county of Crawford and State of Michigan, have invented certain new and useful Improvements in Car-Axles, of which the following is a specification, reference being had therein to the accompanying drawings, in which—

Figure 1 represents a plan of a pair of wheels mounted on an axle having my improvement attached. Fig. 2 is a similar view with the parts in a different position, and Fig. 3 is a longitudinal section of one end of the axle and its accompanying parts.

This improvement relates to that class of axles designed to allow of the wheels moving with the axle when running on a straight track, and yet turn independently of each other when running on curved tracks; and the invention consists in the peculiar construction, arrangement, and combination of parts, hereinafter more particularly described, and then definitely pointed out in the claims.

Referring now to the details of the drawings, A represents the axle, on which is loosely mounted the wheels B B', which are fitted on the reduced part $a$ of the axle and held between a shoulder, $a'$, and a collar, C, which is shrunk on, so as to firmly hold the wheel on the axle, but yet allows it to turn thereon.

D D' are short levers, pivoted at $d\,d$ to the axle, and E E' are sliding dogs, also attached to the axle, preferably by loops or clips $e\,e$, in such a manner as to slide easily longitudinally on the axle. These dogs are connected with the levers D D' by wire ropes, links, or chains (indicated at F) in such a manner that when the levers are turned in the position shown at D in Fig. 2 the dogs are drawn endwise. To return the dogs to their original and acting position, each dog has a spring, G, which works in a recess in the axle and is there held by the screw $d$, which forms the pivot or fulcrum of the lever D nearest it. One end of this spring finds its point of resistance against one side or end of the recess, while the other end is received by a hole in the dog, and thus the spring always tends to push the dog in the direction of the wheel or the end of the axle, as is plainly shown in Fig. 3. Each wheel is provided with a lug, as $b$ or $b'$, which may either be fastened on with a bolt or screw or be formed integral with the wheel.

The operation is as follows: Supposing the axle to be suitably mounted to form part of the support of a railroad-car, which car was traveling in the direction of the arrow in Fig. 1, the wheel B', as it revolves, will cause its lug $b'$ to come in contact with the dog E', and thus turn the axle, and the dog E on the opposite end of the axle would come in contact with the lug $b$ on the wheel B, and thus both wheels and axle are compelled to turn together. If the car were going in the opposite direction, the lug $b$ would drive the axle and the dog E' would drive the wheel B'.

Supposing the car were turning a curve and running in the direction represented by the arrow $x$, the wheel B would of course tend to travel faster than the other, and if the wheels were fast on the axle, or so arranged that they could not turn on it, there would be, as is well known, a torsional effect on the axle and a wearing of the wheel. This, however, will not occur with my arrangement, for as the wheel B travels faster it turns on the axle until the lug $b$ acts on the lever D, causing it and the dog E' to assume the position shown in Fig. 2, and thus leaving both wheels momentarily free of the axle and capable of turning independently of the axle and of each other. As soon as the lug $b$ has cleared the lever D, the spring G, acting on the dog E, restores the lever and dog to their original position.

Should the curve be sufficiently long to cause the wheel B to make a complete revolution around the axle, the lug $b$ would act on the inclined end of the dog E and push it backward or toward the center of the axle, and the wheel could thus continue to travel around the axle as long as necessary, or until a straight track was reached.

If the car is going in the other direction and traveling on the curve shown by the arrow $y$, the wheel B' would travel faster, and would thus turn on the axle and operate on the lever D' and dog E in the same manner as before described.

By the construction shown, the wheels will travel as easily around a curve as on a straight track. They will not be as likely to run off the tracks as wheels fixed on the axle, because they will not slide on the track, and if thrown off are more easily got on again. As the wheels run with the axle on a straight track, there will be but little wear due to the wheels turning on the axles.

What I claim as new is—

1. The combination, with an axle and a car-wheel provided with a projecting lug, of a sliding dog constructed to be operated by said lug, substantially as described.

2. The combination, with an axle and a car-wheel provided with a projecting lug, of a sliding dog and a pivoted lever operated by said lug, substantially as described.

3. The combination, with an axle and a pair of car-wheels thereon, each provided with a projecting lug, of the pivoted levers D D' and sliding dogs E E, connected to said pivoted levers, the lug on one wheel constructed to actuate the lever and the sliding dog of the other wheel, substantially as described.

In testimony whereof I affix my signature, in presence of two witnesses, this 16th day of March, 1887.

LEVI D. ALLEN.

Witnesses:
JOSEPH BURTON,
HARRY WOODS.